(12) United States Patent
Deng (10) Patent No.: US 10,809,964 B2
(45) Date of Patent: Oct. 20, 2020

(54) PORTABLE INTELLIGENT VOICE INTERACTIVE CONTROL DEVICE, METHOD AND SYSTEM

(71) Applicant: Shenzhen Aukey Smart Information Technology Co., Ltd., Shenzhen (CN)

(72) Inventor: Chao Deng, Shenzhen (CN)

(73) Assignee: Shenzhen Aukey Smart Information Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/708,639

(22) Filed: Dec. 10, 2019

(65) Prior Publication Data

US 2020/0110569 A1 Apr. 9, 2020

Related U.S. Application Data

(63) Continuation of application No. PCT/CN2018/087576, filed on May 18, 2018.

(51) Int. Cl.
*H04R 1/10* (2006.01)
*H04R 1/02* (2006.01)
*H04R 3/00* (2006.01)
*G06F 3/16* (2006.01)
*H04L 29/06* (2006.01)
(Continued)

(52) U.S. Cl.
CPC .............. *G06F 3/16* (2013.01); *H04L 65/60* (2013.01); *H04R 1/028* (2013.01); *H04R 1/1016* (2013.01); *H04R 1/1025* (2013.01); *H04R 1/1041* (2013.01); *H04R 5/033* (2013.01);
(Continued)

(58) Field of Classification Search
CPC . H04R 1/00; H04R 1/02; H04R 1/028; H04R 1/10; H04R 1/1016; H04R 1/1025; H04R 1/1041; H04R 1/1058; H04R 3/00; H04R 3/005; H04R 5/033; H04R 5/04; H04S 1/007; H04L 65/60; G06F 3/16
See application file for complete search history.

(56) References Cited

U.S. PATENT DOCUMENTS 7,877,115 B2 1/2011 Seshadri et al.
9,949,015 B1 * 4/2018 Minoo ................. H04R 1/1091
(Continued)

FOREIGN PATENT DOCUMENTS

CN 101616349 A 12/2009
CN 202524445 U 11/2012
(Continued)

OTHER PUBLICATIONS

International Search Report in corresponding PCT application PCT/CN2018/087576, dated Jan. 30, 2019.

*Primary Examiner* — Thang V Tran
(74) *Attorney, Agent, or Firm* — Westbridge IP LLC (57) ABSTRACT

Disclosed is a portable intelligent voice interactive control device including a body and an earphone detachably connected with the body. The body includes a body casing and a rotating cover. An earphone slot is embedded on a surface of the body casing and configured to accommodate the earphone. The earphone is configured to be accommodated in the earphone slot and electrically connected with the body for charging. Horizontal rotation of the rotating cover allows the earphone to be taken out from a taking hole, and after the earphone is taken out, the body communicates with the body through wireless communication.

17 Claims, 7 Drawing Sheets

(51) Int. Cl.
   *H04R 5/033*   (2006.01)
   *H04R 5/04*    (2006.01)
   *H04S 1/00*    (2006.01)

(52) U.S. Cl.
   CPC ............. *H04R 5/04* (2013.01); *H04S 1/007* (2013.01); *H04R 2420/07* (2013.01)

(56) References Cited

U.S. PATENT DOCUMENTS

2011/0286615 A1* 11/2011 Olodort ................ H04R 1/1025
　　　　　　　　　　　　　　　　　　　　　　　　381/311
2016/0360350 A1* 12/2016 Watson ................... H04L 67/16
2017/0094391 A1*  3/2017 Panecki ............... H04R 1/1016

FOREIGN PATENT DOCUMENTS

| CN | 106454587 A | * | 2/2017 |
| CN | 106488353 A |   | 3/2017 |
| CN | 206181335 U |   | 5/2017 |
| CN | 106878850 A |   | 6/2017 |
| CN | 106952647 A |   | 7/2017 |
| CN | 107333200 A |   | 11/2017 |
| CN | 206639587 U |   | 11/2017 |
| CN | 207100728 U |   | 3/2018 |
| CN | 108550367 A |   | 9/2018 |

\* cited by examiner

PORTABLE INTELLIGENT VOICE INTERACTIVE CONTROL DEVICE, METHOD AND SYSTEM

CROSS-REFERENCE TO RELATED APPLICATIONS

The present disclosure is a Continuation Application of PCT Application No. PCT/CN2018/087576, filed on May 18, 2018, the entire contents of which are incorporated herein by reference.

TECHNICAL FIELD

The present application relates to the field of intelligent voice device technologies, and in particular, to a portable intelligent voice interactive control device, a portable intelligent voice interactive method and a portable intelligent voice interactive system.

BACKGROUND

Echo (Echo Protocol) is routine and also the most commonly used data packet in the network. The path of the current connection node may be known by sending the echo packet, and the path length may be obtained by the round trip time. Amazon's Echo Dot can listen to, play, connect to and control other devices. Echo Dot, which is essentially Echo's "Mini-Me", a cloud-based, voice-activated AI voice interactive device that understands for a ready-to-call Siri with entity, the user wakes up the Echo Dot function by saying her name or other keywords. Echo Dot's built-in microphone array is always ready to listen to sound from all around. Once the keywords are identified, the microphones will record any subsequent words and send them to Amazon's cloud server, which will recognize the voice commands and return instructions to tell Alexa how to respond.

Existing Echo Dot often do not have their own speakers, jacks and cables are needed to be connected with existing speakers, or the Echo Dot may be connected to existing speakers via Bluetooth. In addition, The Dot speaker array performs slightly worse at picking up voice commands, especially when playing music or in a noisy environment, users need to shorten their distance from the Echo Dot to complete the activation, otherwise the command may not be recognized quickly, the user experience is not good, and the use is inconvenient.

SUMMARY

The present application provides a portable intelligent voice interactive control device, a portable intelligent voice interactive method and a portable intelligent voice interactive system, which have no special requirements on the distance between the user and the Echo Dot device, and can also perform fast voice recognition in playing music or in a noisy environment, and the user experience is good.

According to a first aspect, the present application provides a portable intelligent voice interactive control device, which includes a body and an earphone detachably connected with the body, and the body includes a body casing and a rotating cover covering on the body casing. An earphone slot is embedded on a surface of the body casing and configured to accommodate the earphone. The earphone slot is provided with a power output end, and the earphone is provided with a power input end, where the earphone is configured to be accommodated in the earphone slot and electrically connected with the body for charging through the power output end and the power input end. The rotating cover defines a removing hole configured to expose the earphone and facilitate taking out the earphone in response to rotating the rotating cover horizontally; and the earphone is connected to the body through wireless communication after being taken out from the earphone slot.

The body casing includes: a body upper casing, a sound-permeable casing and a body lower casing, where the sound-permeable casing is disposed between the body upper casing and the body lower casing, and the sound-permeable casing is provided with at least one mesh sound-permeable hole. A marquee ring is further disposed at a joint of the sound-permeable casing and the body upper casing, and a light transmissive decorative strip is disposed outside the marquee ring.

In some embodiments, a microphone array, a first communication module, a second communication module, a second speaker and a body processor are disposed inside the body housing, where the body processor is electrically connected with the microphone array, the first communication module, the second communication module and the second speaker respectively. The second communication module includes a mobile data network module, a cellular transceiver and a WiFi transceiver. The earphone is an in-ear type earphone, and the earphone includes an in-ear soft rubber disposed at an end and an earphone casing. An earphone communication module, an earphone processor, a first speaker and a pickup are disposed inside the earphone casing, and the earphone processor is electrically connected with the earphone communication module, the first speaker and the pickup respectively. The earphone communication module is wirelessly connected with the first communication module.

In some embodiments, the earphone communication module and the first communication module are wirelessly connected through WiFi, Bluetooth or infrared. The earphone includes: a TWS earphone, a classic stereo Bluetooth earphone or a classic single-sided Bluetooth earphone.

In some embodiments, a body power storage circuit electrically connected with the body processor is further disposed inside the body housing, and the body power storage circuit is further connected with a charging module and a power output circuit. The power output circuit is further connected with the charging module and the power output end, and the charging module includes a wireless charging module or a USB interface charging module. An earphone power storage circuit connected with the earphone processor is further disposed inside the earphone casing, and the earphone power storage circuit is further connected with the power input end.

In some embodiments, the body further includes a body touch key and a body LED which are connected with the body processor, and the earphone further includes an earphone touch key and an earphone LED which are connected with the earphone processor.

In some embodiments, the second communication module further includes: an e-SIM card module.

According to a second aspect, the present application provides a portable intelligent voice interactive system, which includes the portable intelligent voice interactive control device as described in the first aspect and a cloud server, where the portable intelligent voice interactive control device and the cloud server are in communication connection.

According to a third aspect, the present application provides a portable intelligent voice interactive method, which includes the following operations:

in response to an earphone being taken out from an earphone slot, picking up user voice by a pickup of the earphone, performing an analog-to-digital conversion on the picked-up user voice through an earphone processor, and sending a digital voice signal obtained after the analog-to-digital conversion to a first communication module through an earphone communication module;

in response to receiving the digital voice signal through the first communication module, a body processor sending the digital voice signal to a cloud server through a second communication module in response to the digital voice signal, logging in to an interface of a corresponding cloud server, and performing voice recognition and semantic analysis on the digital voice signal;

in response to the analysis being completed, calling corresponding network data through the cloud server, sending the network data to the second communication module, in response to receiving the network data through the second communication module, the body processor sending the network data to the earphone communication module through the second communication module in response to the network data, in response to receiving the network data through the earphone communication module, the earphone processor performing corresponding voice broadcast according to the network data through a first speaker in response to the network data; or in response to the earphone being accommodated in the earphone slot for charging, picking up user voice through a microphone array of a body, and performing analog-to-digital conversion on the picked-up user voice through the body processor;

the digital voice signal obtained after the analog-to-digital conversion sending the digital voice signal to the cloud server through the second communication module, logging in to an interface of a corresponding cloud server, and performing voice recognition and semantic analysis on the digital voice signal;

in response to the analysis being completed, calling the corresponding network data through the cloud server, sending the network data to the second communication module, in response to the second communication module receiving the network data, the body processor performing corresponding voice broadcast according to the network data through the second speaker in response to the network data; or in response to the earphone being accommodated in the earphone slot for charging, picking up the user voice by the pickup of the earphone, performing analog-to-digital conversion on picked-up user voice through the earphone processor, sending digital voice signal obtained after the analog-to-digital conversion to the first communication module through the earphone communication module;

in response to the first communication module receiving the digital voice signal, the body processor sending the digital voice signal to the cloud server through the second communication module in response to the digital voice signal, logging in to an interface of a corresponding cloud server, and performing voice recognition and semantic analysis on the digital voice signal; and in response to the analysis being completed, calling corresponding network data by the cloud server, sending the network data to the second communication module, in response to the second communication module receiving the network data, the body processor performing corresponding voice broadcast according to the network data through the second speaker in response to the network data.

According to a fourth aspect, the present application provides a computer readable storage medium, which includes a program executable by a processor to implement the method as described in the third aspect.

According to the above embodiments, the portable intelligent voice interactive device of the present application may not only pick up the user voice through the pickup of the earphone, but also pick up the user voice through the microphone array, so that the voice interactive between the user and the device may be more convenient and flexible. The wireless communication connection of the body has no special requirements on the distance between the user and the Echo Dot device. Moreover, since the pickup effect of the earphones worn on the ears is better than the Echo Dot device placed separately, the voice may be recognized quickly when playing music or in a noisy environment, so that the user experience is better. The portable intelligent voice interactive device of the present application has the functions of an ordinary Echo Dot device. In addition, the portable intelligent voice interactive device of the present application may also implement the functions of making a call, sending a short message, and accessing the Internet. The functions are more comprehensive, which may meet user's daily needs, and may replace the functions of the mobile phone to a certain extent, thereby reducing user's eye using time and protect eyesight.

BRIEF DESCRIPTION OF DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION OF THE EMBODIMENTS

The present application will be further described in detail below with reference to the accompanying drawings. Similar components in different embodiments employ associated similar component numbers. In the following embodiments, many of the details are described in order to provide a better understanding of the application. However, those skilled in the art can easily realize that some of the features may be omitted in different situations, or may be replaced by other components, materials, and methods. In some cases, some operations related to the present application have not been shown or described in the specification, in order to avoid that the core portion of the present application is overwhelmed by excessive description, and for those skilled in the art describing these related operations in detail is not necessary, they can fully understand the relevant operations according to the description in the description and the general technical knowledge in the field.

In addition, the features, operations, or characteristics described in the specification may be combined in any suitable manner to form various embodiments. At the same time, the operations or actions in the method description can also be sequentially changed or adjusted in a manner that can be apparent to those skilled in the art. Therefore, the various sequences in the specification and the drawings are only for the purpose of describing a particular embodiment, and are not intended to imply a necessary sequence, unless it is otherwise stated that one of the sequences must be followed.

The serial numbers themselves for the components herein, such as "first", "second", etc., are only used to distinguish the described objects, and do not have any order or technical meaning. As used herein, "connected" or "coupled", unless otherwise specified, includes both direct and indirect connections (couplings).

Embodiment 1

Referring to FIG. 1 to FIG. 8, the present application provides a portable intelligent voice interactive device, which includes a body 10 and an earphone 20 detachably connected with the body 10.

Figure 4:
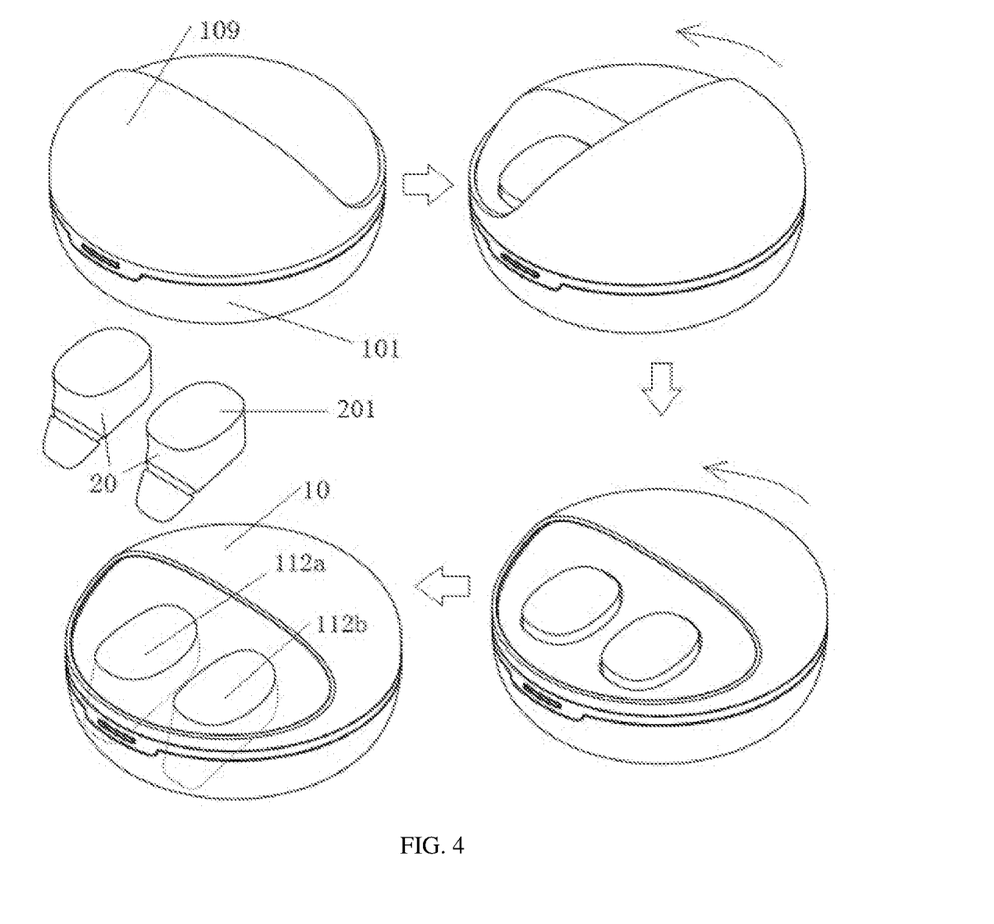
FIG. 4 is a schematic diagram of operation of taking out an earphone from the portable intelligent voice interactive control device according to an embodiment.

The body 10 includes a body casing 101 and a rotating cover 109 (circular as shown in FIG. 4) covering on the body casing 101. An earphone slot 112 is embedded on a surface of the body casing 101 and configured to accommodate the earphone 20. The earphone slot 112 is provided with a power output end 15, and the earphone 20 is provided with a power input end 25, where the earphone 20 is configured to be accommodated in the earphone slot 112 and electrically connected with the body 10 for charging through the power output end 15 and the power input end 25. The rotating cover 109 defines a removing hole, and the earphone may be taken out from the removing hole by rotating the rotating cover 109 horizontally (as shown in FIG. 4). The earphone 20 is connected to the body 10 through wireless communication after being taken out from the earphone slot 112.

Figure 5:
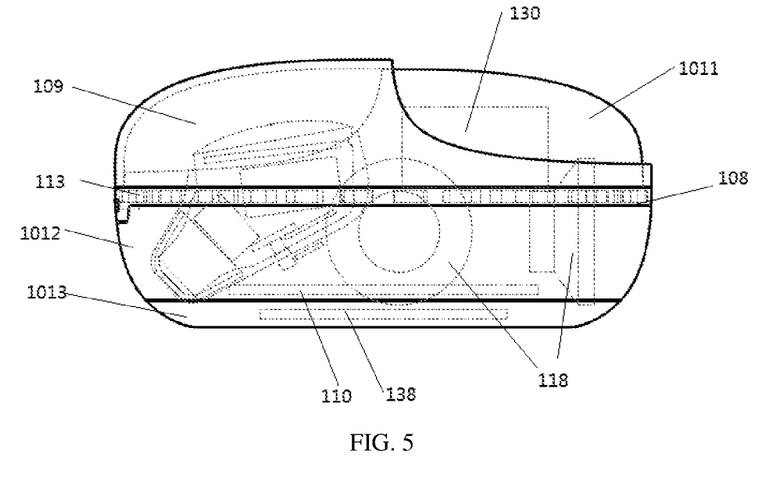
FIG. 5 is a first side perspective view of the portable intelligent voice interactive control device according to an embodiment.
Figure 7:
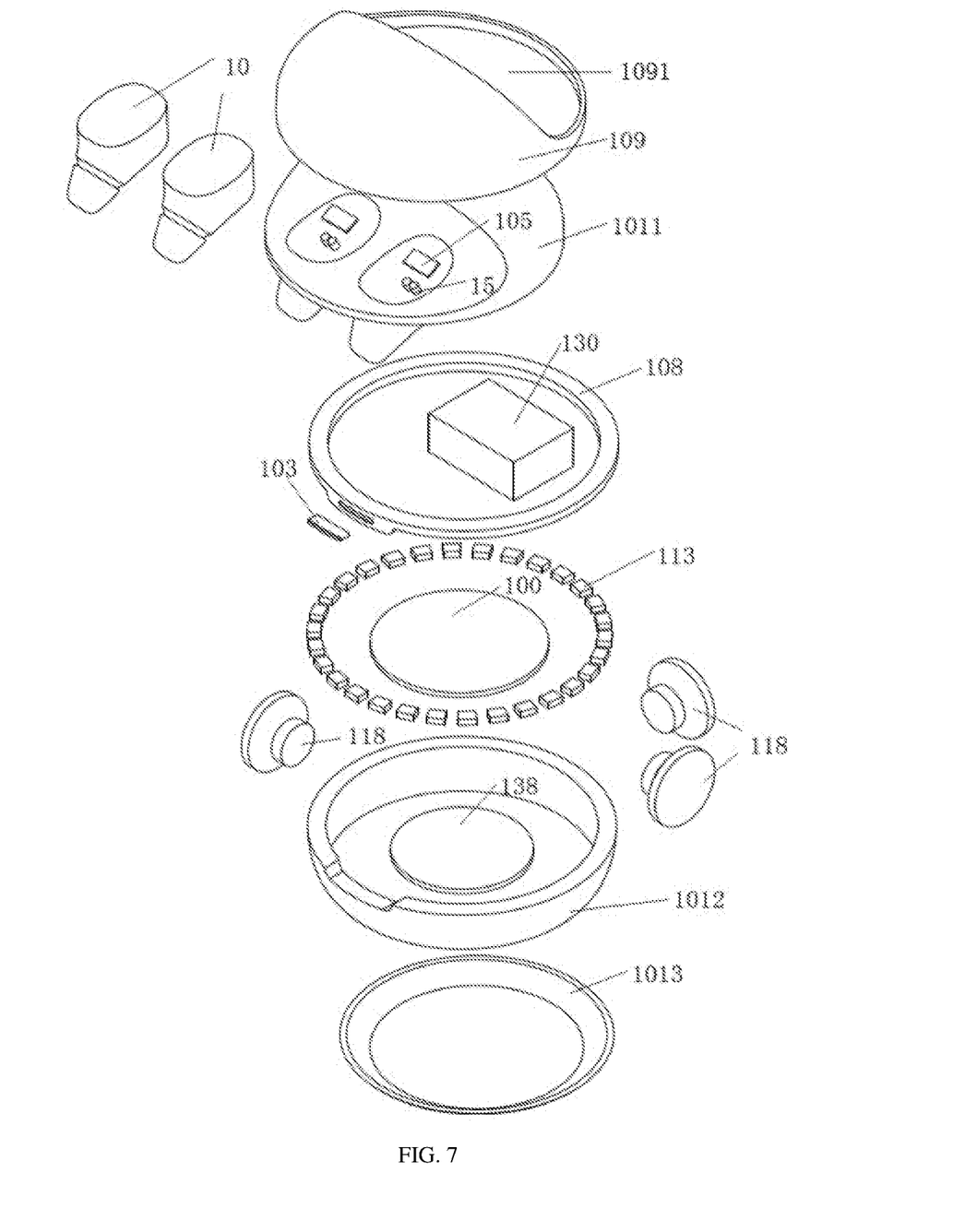
FIG. 7 is an exploded view of the portable intelligent voice interactive control device according to an embodiment.

As shown in FIG. 5 and FIG. 7, the body casing includes: a body upper casing 1011, a sound-permeable casing 1012 and a body lower casing 1013, where the sound-permeable casing 1012 is disposed between the body upper casing 1011 and the body lower casing 1013, and the sound-permeable casing 1012 is provided with at least one mesh sound-permeable hole. A marquee ring 113 is further disposed at a joint of the sound-permeable casing 1012 and the body upper casing 1011, and a light transmissive decorative strip 108 is disposed outside the marquee ring 113.

Figure 2:
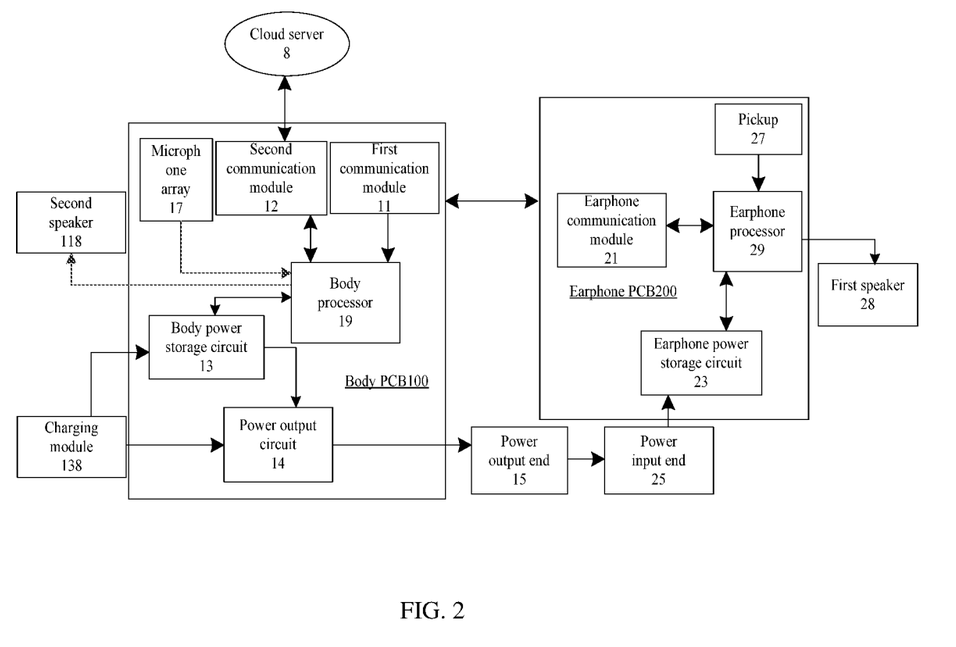
FIG. 2 is a structural block diagram of the portable intelligent voice interactive control device and the portable intelligent voice interactive system according to an embodiment.
Figure 3:
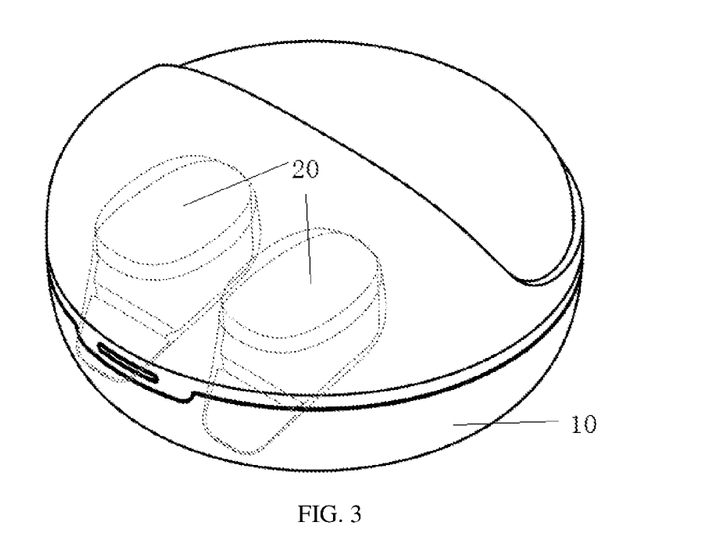
FIG. 3 is a perspective view of the portable intelligent voice interactive control device according to an embodiment.

As shown in FIG. 2, a microphone array 17, a first communication module 11, a second communication module 12, a second speaker 118 and a body processor 19 are disposed inside the body casing 101. The body processor 19 is electrically connected with the microphone array 17, the first communication module 11, the second communication module 12 and the second speaker 118 respectively. The second communication module 12 includes a mobile data network module, a cellular transceiver and a WiFi transceiver. The microphone array 17 is configured to pick up a voice signal spoken by the user, and the voice signal is processed (analog-to-digital converted) by the body processor 19, and then converted into a corresponding digital voice signal and sent out by the second communication module 21.

Figure 6:
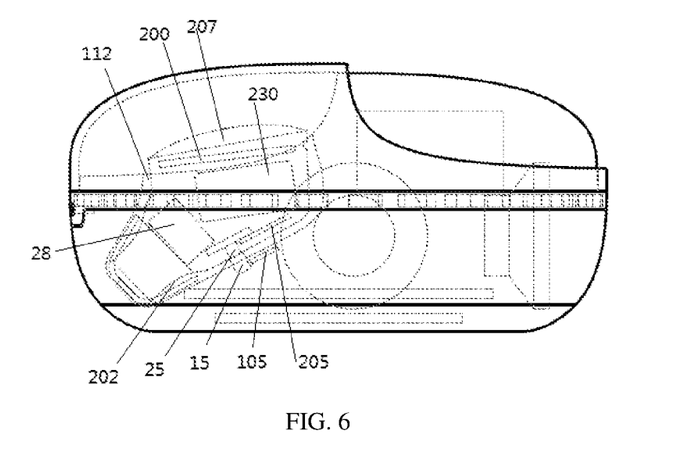
FIG. 6 is a second side perspective view of the portable intelligent voice interactive control device according to an embodiment.
Figure 8:
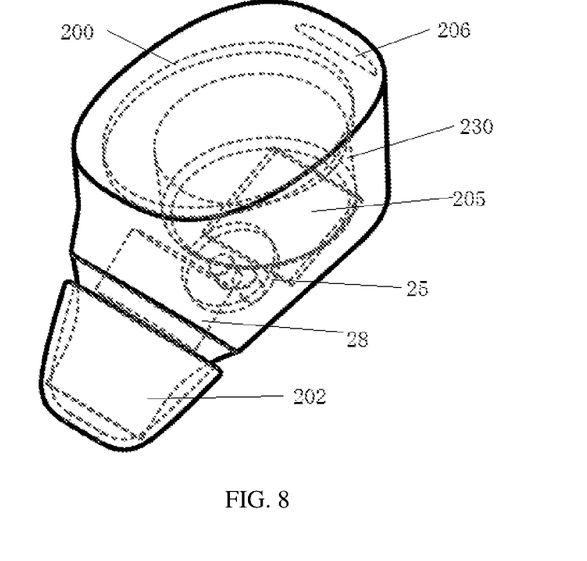
FIG. 8 is a perspective view of the earphone according to an embodiment.

As shown in FIG. 2, FIG. 6 and FIG. 8, the earphone 20 is an in-ear type earphone, and the earphone 20 includes an in-ear soft rubber 202 disposed at an end and an earphone casing 201. An earphone communication module 21, an earphone processor 29, a first speaker 28 and a pickup 27 are disposed inside the earphone casing 201. The earphone processor is electrically connected with the earphone communication module 21, the first speaker 28 and the pickup 27 respectively. The earphone communication module 21 is wirelessly connected with the first communication module 11. The pickup 27 is configured to pick up a voice signal spoken by the user, and the voice signal is processed (analog-to-digital converted) by the earphone processor 29, and then converted into a corresponding digital voice signal and sent out by the earphone communication module 21.

The portable intelligent voice interactive device of the present application has two operation modes: a separated operation mode and an integrated operation mode.

Regarding the separated operation mode, namely, when the earphone 20 is taken out from the earphone slot 112, the body processor 19 acquires the digital voice signal sent by the earphone communication module 21 through the first communication module 11. In response to the digital voice signal, the body processor 19 communicates with the cloud server 8 through a mobile data network module (3G/4G/5G) or a WiFi transceiver, and sends the digital voice signal to the cloud server 8 and accesses the cloud server 8. The cloud server 8 performs voice recognition and semantic analysis on the digital voice signal. If the result is related to making a call and sending a short message, the analysis result is sent back to the portable intelligent voice interactive control device. Then the existing technology is used to realize the functions of making a call and sending a short message through the cellular transceiver. Otherwise, the server performs corresponding Internet data processing.

Regarding the integrated operation mode, namely, when the earphone 20 is accommodated in the earphone slot 112 for charging, the body processor 19 directly picks up the voice signal spoken by the user through the microphone array 17, and converts it into a digital voice signal. The body processor 19 communicates with the cloud server 8 through a mobile data network module (3G/4G/5G) or a WiFi transceiver, and transmits the digital voice signal to the cloud server 8 and accesses the cloud server 8. The cloud server 8 performs voice recognition and semantic analysis on the digital voice signal. If the result of the analysis is related to making a call or sending a short message, the analysis result is sent back to the portable intelligent voice interactive device and the existing technology is used to realize the functions of making a call and sending a short message through the cellular transceiver. Otherwise, the server performs corresponding Internet data processing, calls corresponding network data, and sends the network data back to the portable intelligent voice interactive control device. After the portable intelligent voice interactive control device receiving the network data, the earphone performs corresponding voice broadcast according to the network data.

For example, the cloud server 8 may launch a program to perform an Internet search (such as Baidu search) and send the search result back to the portable intelligent voice interactive device and broadcast it in voice, or launch a program to call the network music player resource for music playback, or launch a road navigation application (such as Amap) to navigate, or launch a program to order audio programs etc.

Specifically, the data interaction process is: sending the digital voice signal to the cloud server 8 through the second communication module 12 via the body processor 19, logging in to the interface of the corresponding cloud server 8, and performing voice recognition and semantic analysis on the digital voice signal. After the analysis is completed, the cloud server 8 calls the corresponding network data according to the corresponding result, and sends the network data to the portable intelligent voice interactive device, and the portable intelligent voice interactive device receives the network data, and performs corresponding voice broadcast according to the network data.

In addition, after the portable intelligent voice interactive device receives the network data, the separated operation mode and the integrated operation mode are not the same when the corresponding voice broadcast is performed according to the network data.

Regarding the separated operation mode, after the portable intelligent voice interactive device receives the network data through the second communication module 12, the body processor 19 forwards the network data to the earphone communication module 21 through the second communication module 12 in response to the network data. After the earphone communication module 21 receives the network data, the earphone processor 29 performs corresponding voice broadcast according to the network data through the first speaker 28 in response to the network data.

Regarding the integrated operation mode, after the portable intelligent voice interactive device receives the network data through the second communication module 12, the body processor 19 performs corresponding voice broadcast according to the network data through the second speaker 118 in response to the network data.

Referring to FIG. 2 and FIG. 7, a body power storage circuit 13 electrically connected with the body processor 19, and a charging module 138 and a power output circuit 14 that are both electrically connected with the body power storage circuit 13 are further disposed inside the body casing 101. The charging module 138 is further connected with the charging module 138 and the power output end 15, and the body power storage circuit 13 is further connected with a body battery 130.

In the above structure, the microphone array 17, the first communication module 11, the second communication module 12, the second speaker 118, the body processor 19, the body power storage circuit 13, the power output circuit 14, the power output end 15, and the charging module 138 constitute a basic composition of the body 10. As shown in FIG. 2 and FIG. 8, in some embodiments, the microphone array 17, the first communication module 11, the second communication module 12, the body processor 19, the body power storage circuit 13, and the power output circuit 14 are disposed on a body PCB 100.

Referring to FIG. 2, FIG. 6, and FIG. 8, an earphone power storage circuit 23 electrically connected with the earphone processor 19, and a power input end 25 electrically connected with the earphone power storage circuit 23 are further disposed inside the earphone casing 201. The earphone power storage circuit 23 is further connected with an earphone battery 230. The power input end 25 of the earphone 20 is matched with the power output end 15 of the body 10, and may include, but is not limited to, a metal contact, a metal thin face or a metal male-female plug connector, and a metal contact form is shown in FIG. 6.

In the above structure, the earphone communication module 21, the earphone processor 29, the first speaker 28, the pickup 27, the earphone power storage circuit 23, and the power input end 25 constitute a basic composition of the earphone 20. As shown in FIG. 2 and FIG. 5, in some embodiments, in the above structure, the earphone communication module 21, the earphone processor 29, the pickup 27, and the earphone power storage circuit 23 are disposed on an earphone PCB 200.

In some embodiments, the charging module 138 includes an existing wireless charging module or a conventional USB interface charging module.

When the earphone 20 is accommodated in the earphone slot 112 for charging, on condition that the charging module 138 is not connected to an external power source, the body 10 transmits power to the power input end 25 through the body battery 130, the power output circuit 14 and the power output end 15 to charge the earphone 20. On condition that the charging module 138 is connected to the external power source, power is transmitted to the power input end 25 through the power output circuit 14 and the power output end 15, and when the charging of the earphone 20 is completed, the battery 130 is charged through the energy circuit 13.

It can be seen that, due to the basic composition of the body 10 and the earphone 20, the portable intelligent voice interactive device may pick up the user voice through the pickup 27 of the earphone 20, and may also pick up the user voice through the microphone array 17, thereby realizing more convenient and flexible voice interactive between the user and the device. The earphone 20 is wirelessly connected with the body 10, so that there is no special requirement for the distance between the user and the Echo Dot device (only in an wireless communication atmosphere). The voice pickup effect of the earphone worn on the ears is much better than the Echo Dot devices placed separately, so that fast voice recognition may be performed in playing music or in a noisy environment, and the user experience is good. The portable intelligent voice interactive device of the present application may also pick up the user voice through the microphone array 17 of the body 10 and perform voice broadcast through the second speaker 118 of the body 10, so that the portable intelligent voice interactive device has the functions of the ordinary Echo Dot device. In addition, the functions of making a call, sending a short message and accessing the Internet may be achieved through the second communication module 12. The functions are more comprehensive, which may meet user's daily needs, and may replace the functions of the mobile phone to a certain extent.

It should be noted that, a large amount of data processing and data analysis work is done by the cloud server, and the network data resources are sent back to the portable intelligent voice interactive device by means of mobile data communication (3G/4G/5G) or WiFi communication, so that the portable intelligent voice interactive device does not need a processor with powerful computing power, and does not need an expensive display screen, but only needs better communication capability, and may save the hardware cost of the portable intelligent voice interactive device compared with the mobile phone, and the use is more convenient and intelligent, which may facilitate user leave their dependence on the mobile phone.

Referring to FIG. 3 to FIG. 6, in some embodiments, the earphone 20 accommodated in the earphone slot 112 is detachably connected with the body 10 by magnetic attraction, buckling or snapping, and the magnetic attraction form is shown in FIGS. 5 to 8, an earphone magnetic device 205 and a body magnetic device 105 are attracted to each other.

In some embodiments, a position sensor electrically connected with the body processor 19 is further disposed in the body casing 101. The position sensor is configured to detect whether the position of the earphone 20 in the earphone slot 112 is accurate, and avoid the power input end 25 of the earphone and the power output end 15 of the body being "virtually connected", which affects the charging effect of the earphone.

Figure 11:
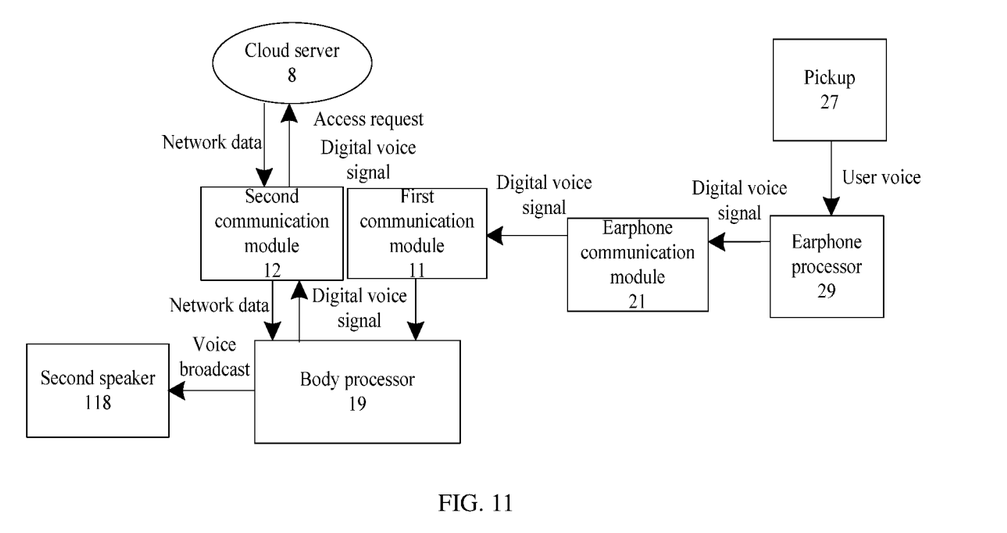
FIG. 11 is a schematic diagram of a data interaction process of the portable intelligent voice interactive system in a standby mode according to still another embodiment.

Referring to FIG. 11, in some embodiments, the second communication module 12 further includes: an e-SIM card module. The e-SIM card is embedded inside the internal body 10 and a separate SIM card slot is no longer necessary, so that the body may be lighter and thinner, and the manufacturing cost may be lower. It is no longer necessary for the user to insert the card, and the user may use their own carrier network and package directly by software registration or direct purchase.

In some embodiments, the earphone communication module 21 and the first communication module 11 may be wirelessly connected through a wireless connection such as WiFi, Bluetooth, or infrared. Preferably, in an embodiment, the earphone communication module 21 and the first communication module 11 may be wirelessly connected by Bluetooth, namely, the earphone communication module 21 and the first communication module 11 both include a Bluetooth module. At this time, the earphone 20 may be a TWS earphone, a classic stereo Bluetooth earphone or a classic single-sided Bluetooth earphone.

When the earphone 20 is a TWS earphone (referring to FIGS. 3 to 6), the main earphone is accommodated in a left earphone slot 112a, and an auxiliary earphone is accommodated in a right earphone slot 112b.

During the voice broadcast, the main earphone obtains the voice signal (including the call voice signal, the text message voice signal and the network data sent back by the cloud server 8) sent by the body 10 through the earphone communication module 21. After obtaining the voice signal, the main earphone sends the voice signal to the main earphone speaker for broadcast, and forwards the voice signal to the auxiliary earphone by means of near field communication such as microwave communication.

The user voice signal may be picked up through the main earphone or the auxiliary earphone and sent to the body 10 through the first communication module 11. The user voice signals picked up from the main earphone and the auxiliary earphone are denoised and compared by the body processor 19 to be merged into one voice signal.

In some embodiments, the second communication module 12 may also be used to implement a wireless communication connection between the portable intelligent voice interactive control device and the existing smart home devices, thereby further implementing control of the smart home devices through voice, so that the portable intelligent voice interactive control device may be a "remote control" for smart home devices. Specifically, the earphone 20 picks up a voice command spoken by the user, and the earphone processor 29 sends the voice command to the first communication module 11 of the body 10 through the earphone communication module 21 in response to the voice command. The body processor 19 sends the voice command to the smart home device through the second communication module 12 in response to the voice command, so that the smart home device may perform operations such as power on, power off, or temperature adjustment. Or, the microphone array 17 picks up a voice command spoken by the user, and the body processor 19 sends the voice command to the smart home device through the second communication module 12 in response to the voice command, so that the smart home device may perform operations such as power on, power off, or temperature adjustment.

In some embodiments, the body 10 is further provided with a body touch key 104 and a body LED 103 which are connected with the body processor 19. The body LED 103 includes a power indicator light, a SIM card light, a WiFi light, and a voice light. For example:

(1) The battery indicator light is set to four grids to display the battery power, 1) when power is greater than 75% and less than or equal to 100%, the four grids are all lit up;

2) when power is greater than 50% and less than or equal to 75%, three grids are lit up;

3) when power is greater than 25% and less than or equal to 50%, two grids are lit up;

4) when power is greater than 10% and less than or equal to 25%, one grid is lit up; and 5) when power is less than or equal to 10%, one grid breathes.

(2) The SIM card light status may indicate that, signal is available when the green light is lit up, searching network when the light flashes, and no service when the light is off;

(3) The WiFi light status may indicate that, signal is available when the green light is lit up, searching network when the light flashes, and no service when the light is off;

when data is transmitted, the green light of the WiFi may breath when WiFi traffic is used, and the green light of the SIM card may breath when the SIM card traffic is used, and WiFi is preferentially used.

(4) The voice light status may indicate that, the device is woken up when the green light is lit up, searching is performed when the green light flashes, broadcast is performed when the green light breathes.

In some embodiments, the earphone 20 is further provided with an earphone touch key 204 and an earphone LED 203 which are connected with the earphone processor 29.

In some embodiments, when the earphone 20 is accommodated in the earphone slot 112 for charging, the earphone 20 is in an inactive sleep state. However, in case the microphone array 17 is damaged and cannot be used, a standby mode may be turned on. Namely, the earphone 20 may be woken up through the earphone touch key 204, so that the user voice may be picked up by the pickup 27 of the earphone 20, and the picked-up user voice may be analog-digital converted to digital voice signal and sent to the first communication module 11 through the earphone 20. The body processor 19 is communicated with the cloud server 8 through a mobile data network module (3G/4G/5G) or a WiFi transceiver in response to the digital voice signal, and sends the digital voice signal to the cloud server 8 and accessed to the cloud server 8 for data interaction. It should be noted that, during the voice broadcast, the second speaker 118 is still used for voice broadcast, namely, the voice signal and the short message voice signal received by the cellular transceiver, and the network data sent by the cloud server 8 are not sent to the earphone 20 via the body processor 19, but is sent directly to the second speaker 118 such that the second speaker 118 performs a voice broadcast.

In some embodiments, when the earphone 20 is taken out from the earphone slot 112, the earphone 20 may send a search signal for the body 10 through the earphone communication module 21 by long pressing the earphone touch key 204. When the body 20 receives the search signal for the body 10 through the first communication module 11, all the indicator lights of the body LED 103 may flash at a high frequency and the second speaker 118 may make a promote tone, thereby facilitating the user to retrieve the lost body 10. The body 10 may send a search signal for the earphone 20 through the first communication module 11 by long pressing the body touch key 104. When the earphone 20 receives the search signal through the earphone communication module 21, all the indicator lights of the earphone LED 204 may flash at a high frequency and the first speaker 28 may make a prompt tone, thereby facilitating the user to retrieve the lost earphone 20. It can be seen that the portable intelligent voice interactive control device of the present application has a retrieving function to avoid loss of the earphone or the charging stand (body 10). Therefore, compared with the existing earphone charging stand (including the existing TWS earphone charging stand), the portable intelligent voice interactive control device is not only convenient to carry, but also has a retrieving function, so that the earphone and the charging stand shall not be easily lost.

In summary, according to the portable intelligent voice interactive control device of the present application, the earphone is accommodated in the body, which makes the TWS earphone and its charging stand easy to carry. In addition, the TWS earphone may be connected the charging stand with the functions of making a call, sending a message, and accessing the Internet, so that the TWS earphone is no longer dependent on the mobile phone. In addition, the portable intelligent voice interactive control device of the present application may also implement the functions of making a call, sending a short message, and accessing the Internet and may replace the functions of the mobile phone to a certain extent, and the voice interaction has replaced the interaction of mobile phone screen operation, thereby reducing user's eye using time and protect eyesight.

Embodiment 2

Figure 1:
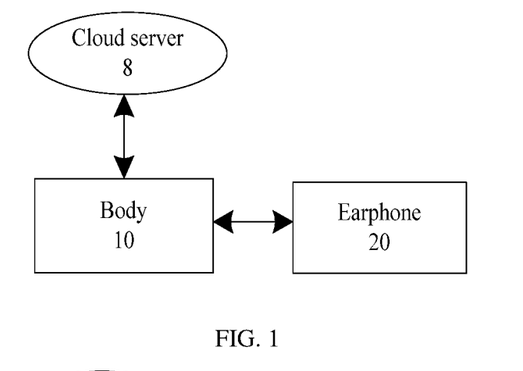
FIG. 1 is a schematic diagram of a portable intelligent voice interactive control device and a portable intelligent voice interactive system of the present application.

Referring to FIG. 1 and FIG. 2, the present application further provides a portable intelligent voice interactive system, including: a portable intelligent voice interactive control device as recited in Embodiment 1 and a cloud server, where the portable intelligent voice interactive control device is in communication with the cloud server 8.

Figure 9:
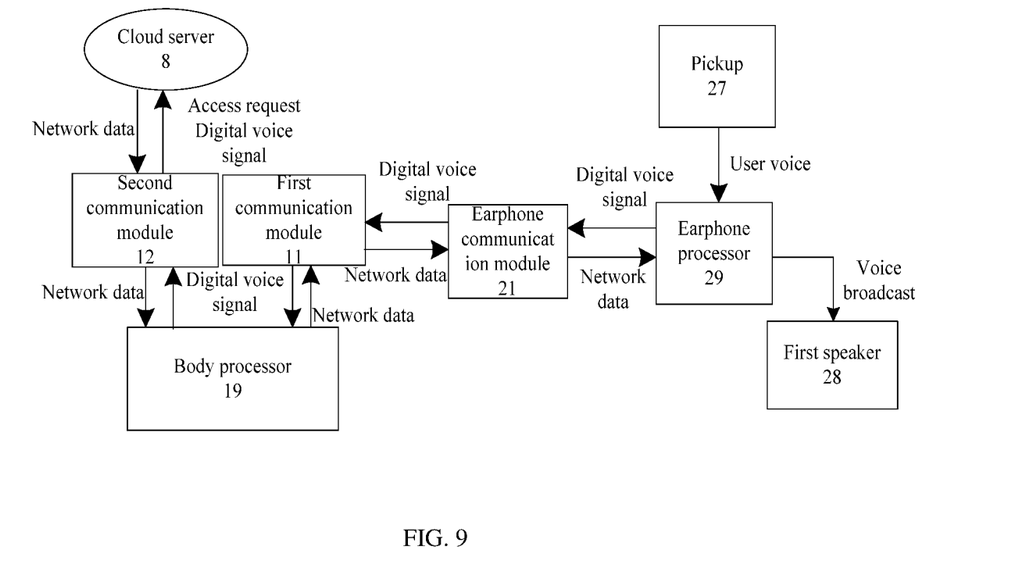
FIG. 9 is a schematic diagram of a data interaction process of the portable intelligent voice interactive system according to an embodiment.
Figure 10:
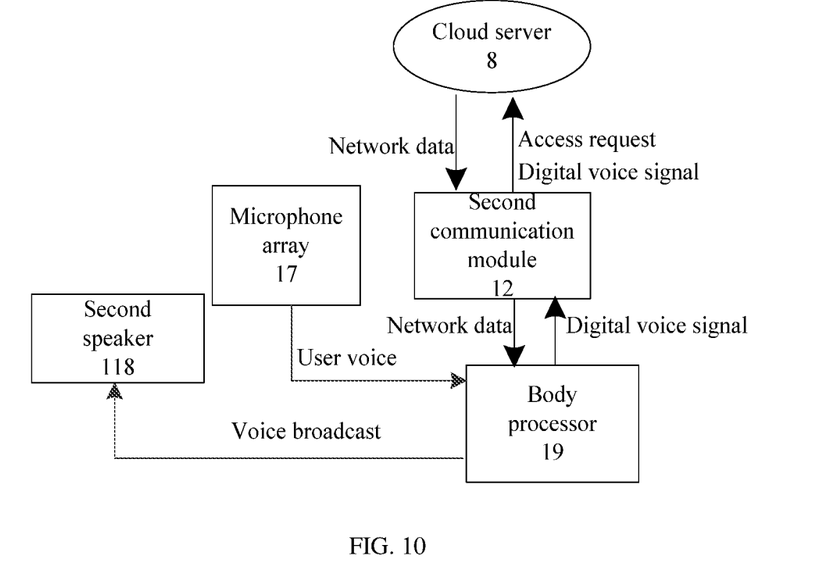
FIG. 10 is a schematic diagram of a data interaction process of the portable intelligent voice interactive system according to another embodiment.

Referring to FIG. 9 and FIG. 10, according to the separated operation mode as described above, a data interaction process of the portable intelligent voice interactive system includes:

A voice recognition stage: picking up the user voice by the pickup 27 of the earphone 20, and performing analog-to-digital conversion on the picked-up user voice through the earphone processor 29. Sending the digital voice signal obtained after the analog-to-digital conversion to the first communication module 11 through the earphone communication module 21. After the communication module 11 receiving the digital voice signal, the body processor 19 sends a log in access request and the digital voice signal to the cloud server 8 through the second communication module 12 in response to the digital voice signal, and logs in to the interface of the corresponding cloud server 8, and performs voice recognition and semantic analysis on the digital voice signal.

A data invocation stage: after the analysis is completed, the cloud server 8 calls corresponding network data, such as search results obtained by performing Baidu search, or song audio resources obtained by calling a network music player, or navigation data obtained by using Amap to search and plan paths, etc., and sends the network data to the portable intelligent voice interactive control device.

A voice broadcast stage: after receiving the network data sent by the cloud server 8 through the second communication module 12, the portable intelligent voice interactive control device sends the network data to the earphone 20 through the first communication module 11, so that the earphone 20 may perform a corresponding voice broadcast through the first speaker 28 according to the network data.

Or, referring to FIG. 10, according to the integrated operation mode as described above, a data interaction process of the portable intelligent voice interactive system includes:

A voice recognition stage: the voice signal spoken by the user is directly picked up through the microphone array 17, and converted into a digital voice signal. and then communicates with the cloud server 8 through the second communication module (the internet module, the WiFi transceiver) of the mobile data. Sending the digital voice signal to the cloud server 8 and accessing the cloud server 8, and logging in to the interface of the corresponding cloud server 8, performing voice recognition and semantic analysis on the digital voice signal.

A data invocation stage: after the analysis is completed, the cloud server 8 calls corresponding network data, such as search results obtained by performing Baidu search, or song audio resources obtained by calling a network music player, or navigation data obtained by using Amap to search and plan paths, etc., and sends the network data to the portable intelligent voice interactive control device.

A voice broadcast phase: the portable intelligent voice interactive control device receives the network data sent by the cloud server 8 through the second communication module 12, and then causes the body processor 19 to perform the corresponding voice broadcast by using the second speaker 118 according to the network data.

In addition, referring to FIG. 11, according to the standby operation mode as described above, the process of data interaction of the portable intelligent voice interactive system includes:

A voice recognition stage: picking up the user voice by the pickup 27 of the earphone 20, and performing analog-to-digital conversion on the picked-up user voice through the earphone processor 29. Sending the digital voice signal obtained after the analog-to-digital conversion to the first communication module 11 through the earphone communication module 21. After the communication module 11 receiving the digital voice signal, the body processor 19 sends a log in access request and the digital voice signal to the cloud server 8 through the second communication module 12 in response to the digital voice signal, and logs in to the interface of the corresponding cloud server 8, and performs voice recognition and semantic analysis on the digital voice signal.

A data invocation stage: after the analysis is completed, the cloud server 8 calls corresponding network data, such as search results obtained by performing Baidu search, or song audio resources obtained by calling a network music player, or navigation data obtained by using Amap to search and plan paths, etc., and sends the network data to the portable intelligent voice interactive control device.

The voice broadcast phase: the portable intelligent voice interactive control device receives the network data sent by the cloud server 8 through the second communication module 12, and then causes the body processor 19 to perform the corresponding voice broadcast by using the second speaker 118 according to the network data.

Correspondingly, the present application further provides a portable intelligent voice interactive method, including:

When the earphone 20 is taken out from the earphone slot 112, the user voice is picked up through the pickup 27 of the earphone 20, and the picked-up user voice is analog-to-digital converted through the earphone processor 29. The digital voice signal obtained after the analog-to-digital conversion is sent to the first communication module 11 through the earphone communication module 21. After the first communication module 11 receives the digital voice signal, the body processor 19 sends a log in access request and the digital voice signal to the cloud server 8 through the second communication module 12 in response to the digital voice signal, and logs in the interface of the corresponding cloud server, and performs voice recognition and semantic analysis on the digital voice signal. After the analysis is completed, the cloud server 8 calls the corresponding network data, and sends the network data to the second communication module 12. After the second communication module 12 receives the network data, the body processor 19 forwards the network data to the earphone communication module 21 through the second communication module 12 in response to the network data. After the earphone communication module 21 receives the network data, the earphone processor 29 broadcasts the corresponding voice according to the network data through the first speaker 28 in response to the network data.

When the earphone 8 is accommodated in the earphone slot 112 for charging, the user voice is picked up through the microphone array 17 of the body 10, and the picked-up user voice is analog-to-digital converted through the body processor 19. The digital voice signal obtained after the analog-to-digital conversion sends the log in access request and the digital voice signal to the cloud server 8 through the second communication module 12, and logs in the interface of the corresponding cloud server, and performs voice recognition and semantic analysis on the digital voice signal. After the analysis is completed, the cloud server 8 calls the corresponding network data, and sends the network data to the second communication module 12. After the second communication module 12 receives the network data, the body processor 19 performs corresponding voice broadcast according to the network data through the second speaker 118 in response to the network data.

After the standby operation mode is turned on, the earphone 20 is accommodated in the earphone slot 112 for charging, the user voice is picked up through the pickup 27 of the earphone 20, the picked-up user voice is analog-to-digital converted through the earphone processor 29, and the digital voice signal obtained after the analog-to-digital conversion is sent to the first communication module 11 through the earphone communication module 21. After the first communication module 11 receives the digital voice signal, the body processor 19 sends the log in access request and the digital voice signal to the cloud server 8 through the second communication module 12, and logs in the interface of the corresponding cloud server, and performs voice recognition and semantic analysis on the digital voice signal. After the analysis is completed, the cloud server 8 calls the corresponding network data, and sends the network data to the second communication module 12. After the second communication module 12 receives the network data, the body processor 19 performs corresponding voice broadcast according to the network data through the second speaker 118 in response to the network data.

Those skilled in the art can understand that all or part of the functions of the various methods in the above embodiments may be implemented by hardware or by a computer program. When all or part of the functions in the above embodiments are implemented by a computer program, the program may be stored in a computer readable storage medium, and the storage medium may include: a read only memory, a random access memory, a magnetic disk, an optical disk, a hard disk, etc. The computer executes the program to implement the above functions. For example, the program is stored in the memory of the device, and when the program in the memory is executed by the processor, all or part of the above functions can be realized. In addition, when all or part of the functions in the above embodiments are implemented by a computer program, the program may also be stored in a storage medium such as a server, another computer, a magnetic disk, an optical disk, a flash disk or a mobile hard disk, and may be saved to local device storage by downloading or copying. Or the system is updated in the memory of the local device. When the program in the memory is executed by the processor, all or part of the functions in the above embodiments may be implemented.

The application has been described above with reference to specific examples, which are merely intended to assist in the understanding of the application and are not intended to limit the application. For the person skilled in the art to which the application pertains, several simple derivations, variations or substitutions can be made in accordance with the inventive concept.

What is claimed is:

1. A portable intelligent voice interactive control device, comprising:
   an earphone, comprising:
      an earphone casing,
      an earphone communication module,
      an earphone processor,
      a first speaker,
      a pickup, and
      a power input end; and
   a body, comprising:
      a first communication module, configured to be wirelessly connected with the earphone communication module;
      a body casing, comprising:
         at least one sound-permeable hole,
         wherein an earphone slot is defined inside the body casing and configured to accommodate the earphone, and
         wherein a power output end is disposed in the earphone slot, electrically connected with the power input end and configured to charge the body and the earphone; and a cover rotatably connected with the body casing and configured to at least partially cover the body casing, wherein a removing hole is defined on the cover, and wherein the removing hole is configured to at least partially expose the earphone slot for the earphone being detached or electrically connected with the body in response to the cover being rotated to a first position, and wherein the removing hole is configured to avoid the earphone slot for the earphone slot being covered by the cover in response to the cover being rotated to a second position; and a body processor electrically connected with the first communication module.

2. The portable intelligent voice interactive control device of claim 1, wherein the pickup of the earphone is configured to pick up a user voice signal when the earphone is taken out from the earphone slot, and wherein the body further comprises:
a microphone array electrically connected with the body processor and configured to pick up the user voice signal when the earphone is accommodated in the earphone slot.

3. The portable intelligent voice interactive control device of claim 2, wherein the body further comprises:
a second speaker electrically connected with the body processor;
a second communication module configured to communicate with a cloud server and comprising:
at least one of a mobile data network module, a cellular transceiver, and a WiFi transceiver, and
wherein the body is configured to send a digital voice signal to the cloud server through the second communication module, and
wherein the digital voice signal is obtained by at least one of the following:
generating the digital voice signal by performing an analog-to-digital conversion on the user voice signal picked up by the pickup via the earphone processor, and sending the digital voice signal to the first communication module through the earphone communication module; and
generating the digital voice signal by performing an analog-to-digital conversion based on the user voice signal picked up by the microphone array via the body processor.

4. The portable intelligent voice interactive control device of claim 3, wherein
the portable intelligent voice interactive control device is configured to broadcast voice through at least one of the first speaker and the second speaker.

5. The portable intelligent voice interactive control device of claim 1, wherein the body casing comprises:
a body upper casing,
wherein the body upper casing is configured to be covered by the cover in response to the cover being horizontally rotated to the first position, and be exposed through the removing hole in response to the cover being horizontally rotated to the second position;
a body lower casing; and
a sound-permeable casing disposed between the body upper casing and the body lower casing,
wherein the sound-permeable casing defines the at least one sound-permeable hole in a mesh-shape.

6. The portable intelligent voice interactive control device of claim 5, wherein
a marquee ring is further disposed at a joint of the sound-permeable casing and the body upper casing, and
wherein a light-transmissive decorative strip is disposed outside the marquee ring.

7. The portable intelligent voice interactive control device of claim 1, wherein
the earphone communication module is configured to be wirelessly connected with the first communication module by at least one of the wireless connections of WiFi, Bluetooth, and infrared, and
wherein the earphone comprises: a TWS earphone, a classic stereo Bluetooth earphone or a classic single-sided Bluetooth earphone, and
wherein the second communication module further comprises: an e-SIM card module.

8. The portable intelligent voice interactive control device of claim 1, wherein the body further comprises:
a body power storage circuit electrically connected with the body processor;
a charging module electrically connected with the body power storage circuit and comprising at least one of a wireless charging module and a USB interface charging module; and
a power output circuit electrically connected with the power output end.

9. The portable intelligent voice interactive control device of claim 1, wherein
the body is further provided with a body touch key and a body LED which are connected with the body processor, and
wherein the earphone is further provided with an earphone touch key and an earphone LED which are connected with the earphone processor.

10. The portable intelligent voice interactive control device of claim 9, wherein
the body LED comprises at least one of the following:
a power indicator light configured to indicate a power quantity of the body,
a SIM card light configured to indicate a state of the SIM card,
a WiFi light configured to indicate a WiFi state, and
a voice light configured to indicate a voice state.

11. The portable intelligent voice interactive control device of claim 1, wherein the earphone further comprises an earphone power storage circuit connected with the earphone processor.

12. A portable intelligent voice interactive system, comprising:
a portable intelligent voice interactive control device, comprising:
an earphone, comprising:
an earphone casing,
an earphone communication module,
an earphone processor,
a first speaker,
a pickup, and
a power input end; and
a body, comprising:
a first communication module, configured to be wirelessly connected with the earphone communication module;

a body casing, comprising:
  at least one sound-permeable hole,
    wherein an earphone slot is defined inside the body casing and configured to accommodate the earphone, and
    wherein a power output end is disposed in the earphone slot, electrically connected with the power input end and configured to charge the body and the earphone; and
  a cover rotatably connected with the body casing and configured to at least partially cover the body casing,
    wherein a removing hole is defined on the cover, and
    wherein the removing hole is configured to at least partially expose the earphone slot for the earphone being detached or electrically connected with the body in response to the cover being rotated to a first position, and
    wherein the removing hole is configured to avoid the earphone slot for the earphone slot being covered by the cover in response to the cover being rotated to a second position; and
  a body processor electrically connected with the first communication module; and
a cloud server configured to communicate with the portable intelligent voice interaction control device and invoke corresponding network data based on a digital voice signal sent through a second communication module of a body.

13. The portable intelligent voice interactive system of claim 12, wherein
the pickup of the earphone is configured to pick up a user voice signal when the earphone is taken out from the earphone slot, and
wherein the body further comprises:
  a microphone array electrically connected with the body processor and configured to pick up the user voice signal when the earphone is accommodated in the earphone slot.

14. The portable intelligent voice interactive system of claim 12, wherein the body further comprises:
a second speaker electrically connected with the body processor;
a second communication module configured to communicate with a cloud server and comprising:
  at least one of a mobile data network module, a cellular transceiver, and a WiFi transceiver, and
wherein the body is configured to send a digital voice signal to the cloud server through the second communication module, and
wherein the digital voice signal is obtained by at least one of the following:
  generating the digital voice signal by performing an analog-to-digital conversion on the user voice signal picked up by the pickup via the earphone processor, and sending the digital voice signal to the first communication module through the earphone communication module; and
  generating the digital voice signal by performing an analog-to-digital conversion based on the user voice signal picked up by the microphone array via the body processor.

15. The portable intelligent voice interactive system of claim 12, wherein the body casing comprises:
a body upper casing,
  wherein the body upper casing is configured to be covered by the cover in response to the cover being horizontally rotated to the first position, and be exposed through the removing hole in response to the cover being horizontally rotated to the second position;
a body lower casing; and
a sound-permeable casing disposed between the body upper casing and the body lower casing,
  wherein the sound-permeable casing defines the at least one sound-permeable hole in a mesh-shape.

16. The portable intelligent voice interactive system of claim 12, wherein the body further comprises:
a body power storage circuit electrically connected with the body processor;
a charging module electrically connected with the body power storage circuit and comprising at least one of a wireless charging module and a USB interface charging module; and
a power output circuit electrically connected with the power output end.

17. The portable intelligent voice interactive system of claim 12, wherein
the cloud server is configured to perform voice recognition and semantic analysis on the digital voice signal, invoke the corresponding network data, and transmit the network data to the portable intelligent voice interaction control device, and corresponding voice broadcast is performed according to the network data through at least one of the first speaker of the earphone, and a second speaker of the body.

* * * * *